PREPARATION OF α-DICHLOROMETHYL-BENZHYDROLS

Harold F. Wilson, Moorestown, N. J., and W E Craig, Philadelphia, Pa., assignors to Rohm & Haas Company, Philadelphia, Pa., a corporation of Delaware No Drawing. Application March 8, 1954, Serial No. 414,865

4 Claims. (Cl. 260—618)

This invention concerns a process for preparing α-dichloromethylbenzhydrols of the structure (R phenyl)$_2$C(OH)CHCl$_2$ In this process a 1,1-diphenyl-2,2-dichloroethane is oxidized with chromium trioxide, best in the presence of a strong inorganic acid. In this formula R is hydrogen, fluorine, chlorine, or bromine.

Diphenyldichloroethanes are resistant to oxidation by most of the usual techniques which might be suggested for such a purpose. We have observed that nitric acid, hydrogen peroxide, cupric nitrate, lead tetraacetate, selenium dioxide, and oxygen in acidic or alkaline environments fail to oxidize diphenyldichloroethanes to useful products.

We have found, however, that when a diphenyldichloroethane is treated with chromium trioxide in the presence of acetic acid, a substantial portion of the diphenyldichloroethane is converted to an α-dichloromethylbenzhydrol. Usually the product obtained is a mixture of this oxidation product and starting material. This mixture, as well as refined α-dichloromethylbenzhydrol, is highly useful as a pesticidal agent.

As a diphenyldichloroethane there may be used by choice any of these compounds having fluorine, chlorine, or bromine on the phenyl ring or diphenyldichloroethane itself. These compounds are known and methods for their preparation are available. They are effective insecticidal agents against many types of insects, but they are not useful against acarids. Typical starting materials are 1,1-dichlorophenyl-2,2-dichloroethane, 1,1-difluorophenyl - 2,2 - dichloroethane, 1,1-dibromophenyl-2,2-dichloroethane, 1,1 - diphenyl - 2,2 - dichloroethane, etc. These can be represented by the structure (R phenyl)$_2$CHCHCl$_2$ One or a mixture of such compounds is treated with at least an equivalent weight of chromium trioxide, best in acetic acid in excess. While some chromium salt is formed with this acid, the oxidation reaction does not convert a considerable amount of starting material to the desired benzhydrol until a strong inorganic acid, such as sulfuric or hydrochloric acid, is added. The temperature of the reaction mixture is held between about 40° and about 100° C. When the reaction is no longer proceeding, the reaction mixture is worked up, conveniently by washing with water. An inert, volatile organic solvent which is immiscible with water may be used to take up product during the washing step. The solvent is driven off from the washed reaction products, which may be used as obtained or purified by crystallization.

While chromium trioxide has been shown as the prime reactant, there may likewise be used sodium or potassium dichromate together with the needed amount of sulfuric or hydrochloric acid.

Further details are given in the following illustrative examples, wherein parts are by weight.

Example 1

There were mixed 32 parts of 1,1-bis(4-chlorophenyl)-2,2-dichloroethane, 13 parts of chromium trioxide, and 200 parts of glacial acetic acid. Thereto over a period of 45 minutes there was added 98% sulfuric acid for a total of 22 parts. The mixture was stirred. After the exothermic reaction was over, the reaction mixture was heated at 90°–95° C. for an hour. About 250 parts of water and 200 parts of benzene were added. Layers formed and were separated. The organic layer was washed with water, with dilute sodium carbonate solution, and again with water. Solvent was removed under reduced pressure. The product was crystallized from octane. It melted at 97°–101° C. and by analysis proved to be a mixture of 62% α-dichloromethyl-4,4'-dichlorobenzhydrol and 38% 1,1-bis(4-chlorophenyl)-2,2-dichloroethane.

This product was evaluated in dispersion in aqueous sprays against mites on bean plants. A kill of 100% was obtained even at a dilution of 1 to 12,800. At 1 to 25,600 the kill was 93%, while at 1 to 51,200 the kill was 71%.

By the same procedure there may be reacted other diphenyldichloroethanes. Thus, 1,1-bis(4-fluorophenyl)-2,2-dichloroethane yields a product which is chiefly α - dichloromethyl - 4,4' - difluorobenzhydrol; 1,1 - bis-(4 - bromophenyl) - 2,2 - dichloroethane, α - dichloromethyl - 4,4' - dibromobenzhydrol; 1,1 - diphenyl - 2,2 - dichloroethane, α-dichloromethylbenzhydrol; etc. These compounds are similarly useful against spiders, mites, and like pests.

Example 2

The procedure of Example 1 was followed with a mixture of 32 parts of commercial 1,1-bis(chlorophenyl)-2,2-dichloroethane, 19.5 parts of chromium trioxide, 210 parts of acetic acid, and 22 parts of sulfuric acid. A product very much like that of Example 1 was obtained. It gave almost an identical kill of mites.

Example 3

The procedure of Example 1 was followed without the use of sulfuric acid. The product obtained was a mixture of 36% α-dichloromethyl-4,4-dichlorobenzhydrol and 64% of starting material. This mixture was effective both as an insecticide and as an acaricide.

Example 4

A mixture of 60 parts of 1,1-bis(4-chlorophenyl)-2,2-dichloroethane, 16 parts of chromium trioxide, and 485 parts of 70% sulfuric acid was stirred and heated on a steam bath for 24 hours. The organic material was taken up in carbon tetrachloride and the resulting solution washed with water, with aqueous 5% sodium carbonate solution, and again with water. The solvent was distilled off. The residue was taken up in ethanol and was precipitated therefrom to give a gummy solid. By analysis it consisted of about 65% of α-dichloromethyl-dichlorobenzhydrol and about 35% of 1,1-bis(chlorophenyl)-2,2-dichloroethane.

Example 5

The procedure of Example 1 was followed but concentrated hydrochloric acid (40 parts) was substituted for the sulfuric acid. The yield was 26 parts of a product consisting of α-dichloromethyl-4,4'-dichlorobenzhydrol and the starting material. It, too, was found peculiarly effective as a pesticide, being useful against mites and spiders.

The crude product of the process of this invention or purified product may be formulated in dusts, wettable powders, or self-dispersing solutions in conjunction with dispersing agents, wetting or emulsifying agents, and solid or liquid carriers or diluents. The product may be used as the sole toxicants or may be combined with insecticides or fungicides.

We claim:

1. A process for preparing α-dichloromethylbenzhydrols which comprises reacting a compound of the structure (R phenyl)₂CHCHCl₂ wherein R is a member of the class consisting of hydrogen, fluorine, chlorine, and bromine with chromium trioxide in the presence of an acid from at least one member of the class consisting of strong inorganic acids and acetic acid.

2. A process for preparing α-dichloromethylbenzhydrols which comprises reacting a compound of the structure (R phenyl)₂CHCHCl₂ wherein R is a member of the class consisting of hydrogen, fluorine, chlorine, and bromine with chromium trioxide in acetic acid in the presence of a strong inorganic acid.

3. The process of claim 2 wherein the inorganic acid is sulfuric acid.

4. A process for preparing α-dichloromethyldichlorobenzhydrol which comprises reacting 1,1-bis(chlorophenyl)-2,2-dichloroethane and chromium trioxide in acetic acid in the presence of a strong inorganic acid.

No references cited.